United States Patent [19]
Wolansky

[11] 3,862,667
[45] Jan. 28, 1975

[54] DROP CENTER DRIVE STEER AXLE
[75] Inventor: John Wolansky, Southfield, Mich.
[73] Assignee: Eaton Corporation, Cleveland, Ohio
[22] Filed: Sept. 28, 1972
[21] Appl. No.: 293,204

[52] U.S. Cl................. 180/43 R, 180/44 R, 180/88
[51] Int. Cl............................................. B60k 17/30
[58] Field of Search............. 280/2; 180/42, 43, 44, 180/70, 71, 73, 75, 47, 48, 43 A, 43 B

[56] References Cited
UNITED STATES PATENTS

| | | | |
|---|---|---|---|
| 994,019 | 5/1911 | Maxwell | 180/75 |
| 2,871,965 | 2/1959 | Ainsworth | 180/43 R |
| 3,083,782 | 4/1963 | Ivaldi | 180/43 A |
| 3,150,531 | 9/1964 | Singer | 180/75 |
| 3,420,327 | 1/1969 | Nallinger | 180/88 |
| 3,557,634 | 1/1971 | Bixby | 180/44 R |

Primary Examiner—Richard E. Aegerter
Assistant Examiner—Jeffrey V. Nase
Attorney, Agent, or Firm—Teagno & Toddy

[57] ABSTRACT
A drop center drive steer axle adapted to drive and allow pivotal movement of wheels journaled on the outboard ends of the axle. The axle includes a load supporting rigid housing extending transversely of the vehicle and spindle housings pivotally connected to the outboard ends of the rigid housing. The rigid housing has substantially tubular left and right end sections disposed parallel to and substantially coaxial to an axis joining the rotational centers of the wheels and a substantially tubular center section interposed between the end sections and dropped with respect to the wheel axis. The outboard ends of the center section and the respective inboard ends of the end sections are bolted together to define left and right gear reduction housings. The rigid housing contains a high speed differential in the center section driven at its input by a substantially 1:1 ratio right angle drive and drivingly connected at its output to left and right universal joints, disposed adjacent the outboard ends of the rigid housing, via helical speed reduction gears in the gear reduction housings. Left and right wheel drive shafts, adapted to drive the wheels and journaled in the left and right spindle housings, respectively, are driven by the respective universal joints.

3 Claims, 5 Drawing Figures

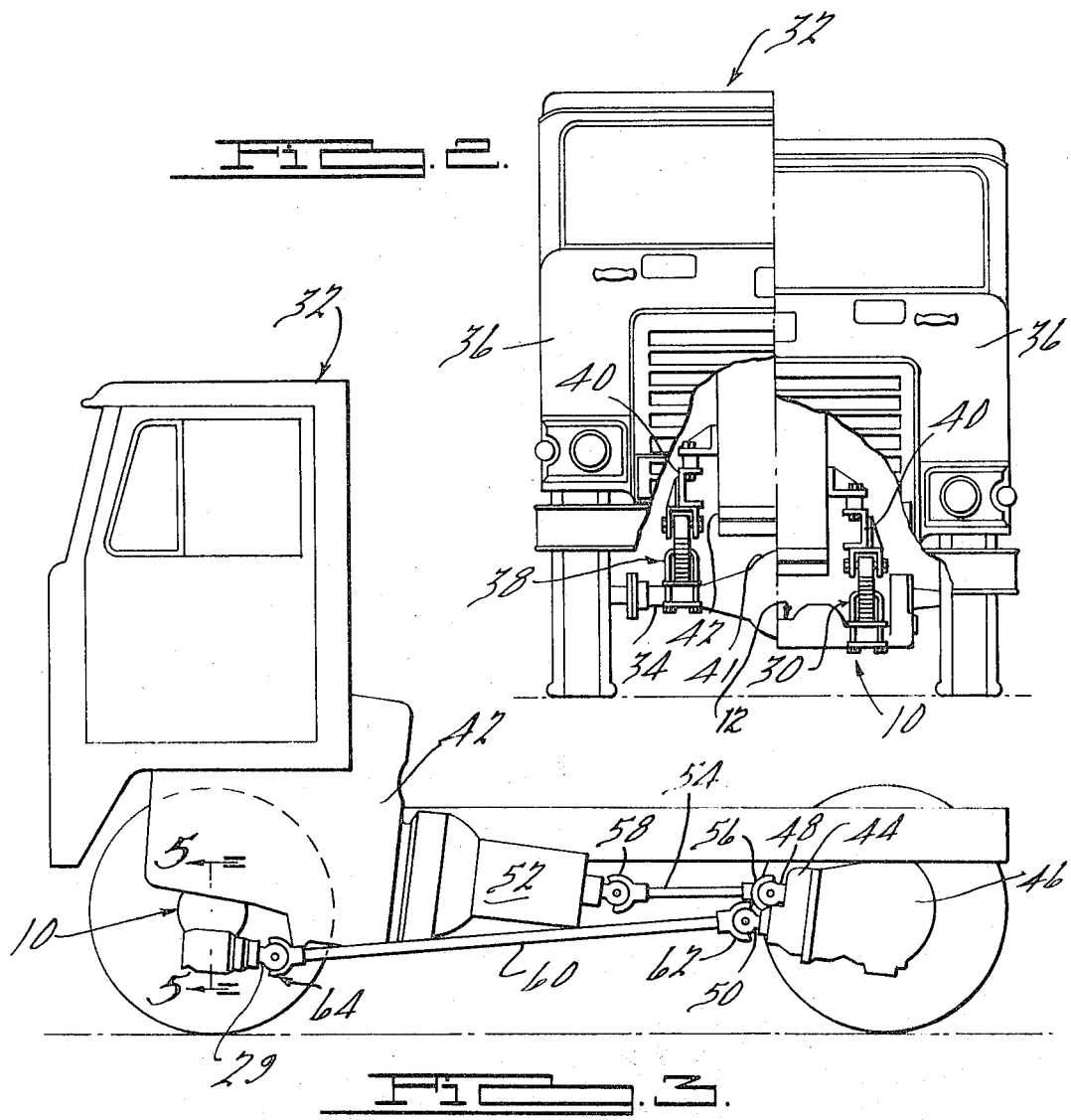
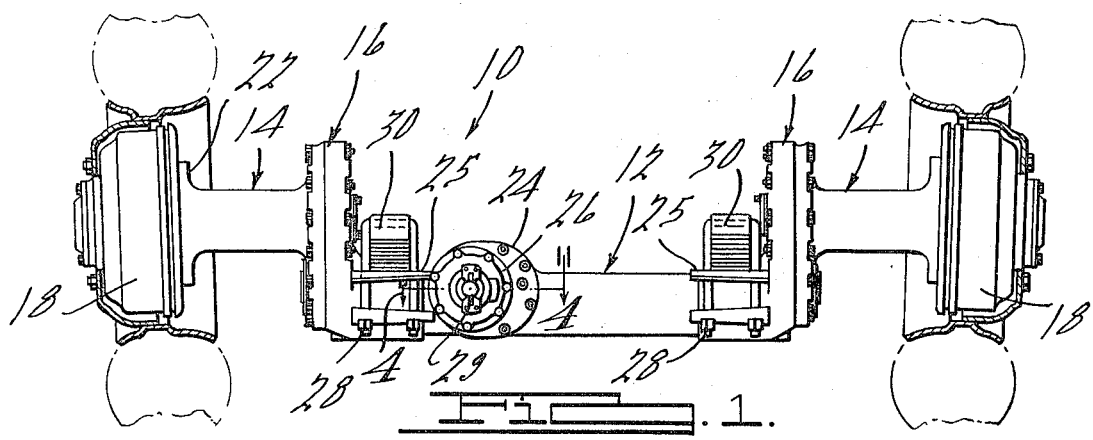

DROP CENTER DRIVE STEER AXLE

BACKGROUND OF THE INVENTION

1. Field of the Invention

This invention relates to drive axles for vehicles and specifically to front drive steer axles.

2. Description of the Prior Art

Conventional drive steer axles for 4 × 4 highway vehicles present problems of high cost and high center of gravity of the vehicle body. Both problems emanate from the basic conventional axle design, embodying a straight axle housing mounting a differential having a high gear ratio ring gear disposed along an axis joining the rotational center of the axle wheels. This design creates a large differential housing projecting well above the rotational center of the wheels. This housing requires raising the vehicle body — and thereby the center of gravity of the vehicle — to provide clearance for the housing and, further, significantly increases the total vehicle cost since raising the vehicle body — whether during initial manufacture or in the course of a subsequent field conversion of a 4 × 2 vehicle — requires major and costly engineering changes in the vehicle suspension system and/or the vehicle frame.

SUMMARY OF THE INVENTION

The primary object of this invention is to provide an improved drive steer axle.

A more specific object is to provide a drive steer axle which may be installed in a vehicle designed for 4 × 2 usage with a minimum of change to the 4 × 2 vehicle configuration.

Another object of the invention is to provide a load supporting drive steer axle which improves clearance between the axle and the vehicle body.

According to an important feature of the present invention, the axle assembly includes a rigid axle housing having tubular end sections and a dropped tubular center section, and spindle housings pivotally secured to the outboard ends of the respective end sections, and a differential is mounted in the axle housing and is drivingly coupled through the tubular axle housing sections to drive shafts journaled in the spindle housings. This basic axle assembly arrangement allows the ready and inexpensive interchange, either during initial production or during subsequent field conversions, of the invention drive steer axle with dead axle assemblies of drop center design.

According to another feature of the invention, the tubular housing end sections have a common axis and the axis of the tubular housing center section is substantially parallel to and spaced below the common end section axis. This specific geometric relationship facilitates suspension of the vehicle body on the axle assembly and enhances the jounce clearance between the axle assembly and the vehicle body.

According to yet another feature of the invention, the differential is located in the dropped center section, the input gear of the differential is driven at substantially the same rotational speed as the input drive shaft to the differential, and the gear set between the differential output and each spindle drive shaft constitutes a low speed reduction gearing. This arrangement allows a low profile differential housing which facilitates the maintenance of proper clearance between the upper side of the differential housing and adjacent overlying vehicle portions, and between the lower side of the differential housing and the road surface.

According to another feature of the invention, an improved motor vehicle is provided in which a rigid front axle housing, having end sections and a center section dropped relative to the end sections, supports the vehicle body by resilient suspension means mounted on the dropped center section, and drive means are provided in the axle housing for driving wheel assemblies rotatably supported on spindle housings pivotally secured to the outboard ends of the axle housing end sections. This arrangement allows the production of a 4 × 4 vehicle having a relatively low center of gravity and thereby a relatively favorable stability factor.

BRIEF DESCRIPTION OF THE DRAWINGS

A preferred embodiment of the invention is shown in the accompanying drawings in which:

FIG. 1 is an elevational view of the rear side of a drop center drive steer axle according to the invention;

FIG. 2 is a partially broken, split view of a truck tractor configured on the left for a conventional drive steer axle and on the right for the drop center drive steer axle of FIG. 1;

FIG. 3 is a schematic side elevational view of the total drive train for a 4 × 4 tractor embodying the drop center drive steer axle of FIG. 1;

DETAILED DESCRIPTION OF THE PREFERRED EMBODIMENT

Figure 4:
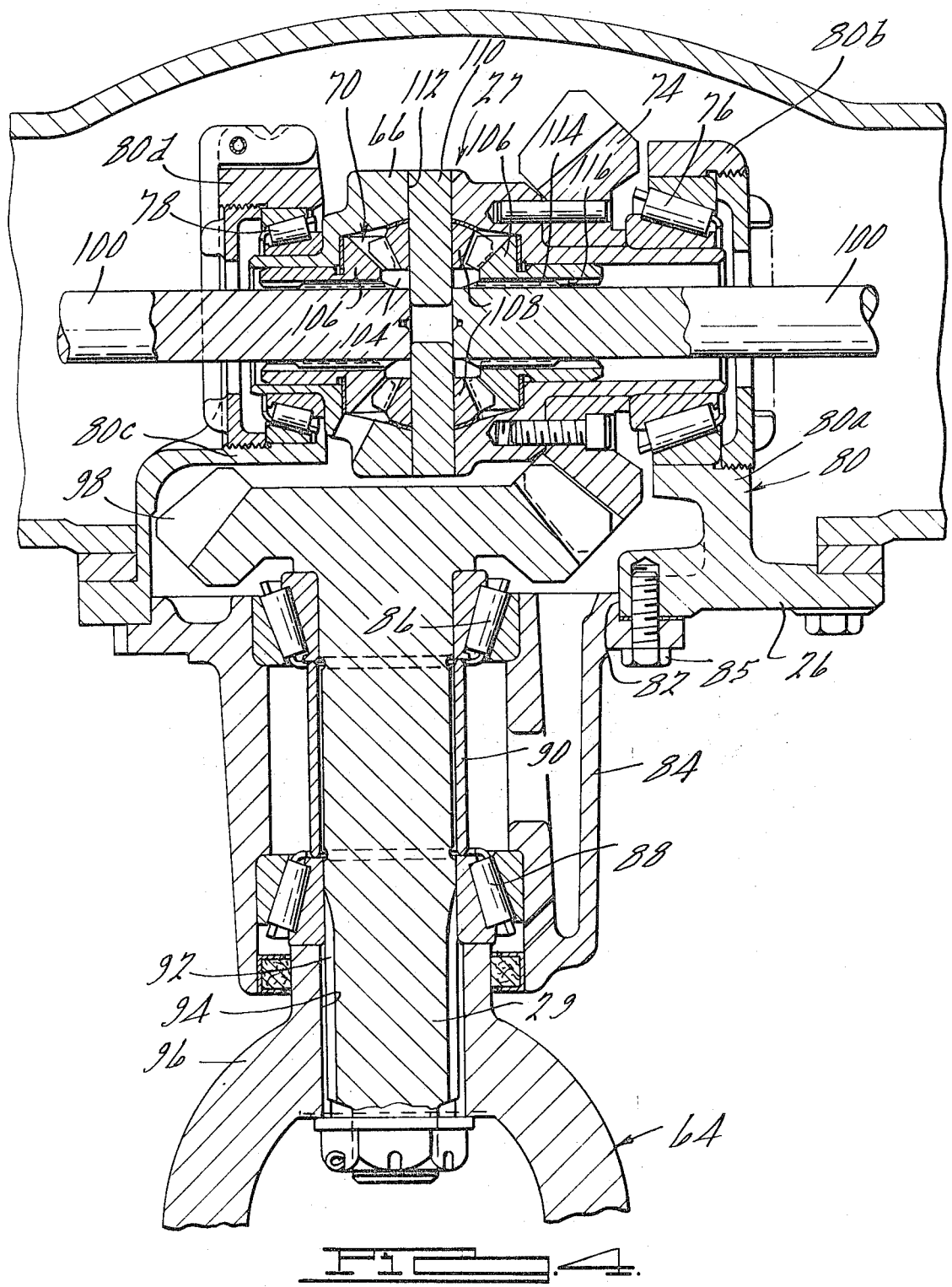
FIG. 4 is a sectional view taken along the line 4—4 of FIG. 1.

The invention axle 10 is best seen exteriorly in FIG. 1 and includes a drop center section 12, a pair of end sections 14, a pair of gear reduction housings 16 and a pair of wheel assemblies 18 which are journaled on a pair of spindle housings 20 (FIG. 5) pivotally secured to the outboard ends 22 of each end section 14. Center section 12 includes a low profile differential housing 24 and a pair of suspension spring mounting pads 25; the pads coact with a pair of U-bolts 28 for securing a pair of truck tractor suspension spring assemblies 30 thereon. A cover 26 bolted to differential housing 24 supports a high speed differential 27 (FIG. 4) and a differential input shaft 29.

FIG. 2 is a split view of a truck tractor 32 having, at the left of the split line, a conventional drive steer axle 34 supporting the tractor body 36 via a suspension spring assembly 38, similar to spring assembly 30, shackled at its ends in known manner to the left frame member 40 of the tractor. At the right of the split line tractor 32 has drop center drive steer axle 10 supporting the tractor body 36 via suspension spring assembly 30 which is shackled at it ends to the right frame member 40 of the tractor. Conventional axle 34 has a high profile differential housing 41 underlying the oil pan 42 of an engine supported by tractor frame 40. In a like manner, center section 12 of axle 10 and its low profile differential housing underlie pan 42, but, as may be seen, there is a substantial increase in the jounce clearance while maintaining the tractor body at a height it was designed for with a nondrive steer axle. By maintaining the design height of the tractor, and hence its design center of gravity, the tractor stability is maintained and pitch amplitude, which contributes greatly to driver fatigue, is not increased.

With reference now to FIG. 3, the driveline for the tractor 32 includes a transfer gear case 44, mounted on the front side of a rear axle assembly 46. Assembly 46 has an input shaft 48 projecting from its upper front side, and two output shafts, one of which projects from the lower front side of transfer gear case and is designated by number 50; the other output shaft, not shown, is drivingly connected to unshown gearing in the rear axle assembly. A transmission 52, driven by engine 42, is drivingly connected to input shaft 48 via a propeller shaft 54 and universal joints 56, 58. The gearing in transfer gear case 44 proportions the input torque from shaft 48 to the rear axle assembly and output shaft 50. Shaft 50 is drivingly connected to input shaft 29 of axle 10 via a propeller shaft 60 and universal joints 62, 64. The relatively low position of output shaft 50 of transfer gear case 44 coupled with the even lower input shaft 29 in the drop center section of axle 10 provides, for many tractor configurations, a straight path between the shafts 50, 29. This allows the shafts 50, 29 to be coupled together by a single propeller shaft without requiring modification to the tractor frame, engine mounting and transmission mounting.

Referring now to FIG. 4, high speed differential assembly 27 includes a planet gear carrier 66, a differential gear train 70, and a beveled ring gear 74. Tapered roller bearings 76, 78 journal carrier 66 in a differential support assembly 80. Support assembly 80 includes a half bearing support structure 80a formed integral with cover 26 and a coacting half bearing member 80b bolted to structure 80a to mount bearing 76, and a half bearing support structure 80c formed integral with cover 26 and a coacting half bearing member 80d bolted to structure 80c to mount bearing 78. Cover 26 is provided with an opening 82 over which a support sleeve 84 is secured by bolts 85. Input shaft 29 passes through sleeve 84 and is journaled therein by tapered roller bearings 86, 88 which are spaced apart by a spacer sleeve 90. The power input end of shaft 29 has splines 92 which receive mating splines 94 in a yoke 96 formed as part of universal joint 64. A beveled gear 98 is formed on the output end of shaft 29; gear 98 meshes with the teeth of ring gear 74. In the disclosed embodiment, the pitch diameter of gears 74, 98 are the same; hence, differential carrier 66 is driven at the same rotational speed as shaft 29. By taking no speed reduction or at most a small speed reduction between gears 74, 98 the diameter of ring gear 74 is kept at a minimum and torque in the differential assembly is maintained at a relatively low value, thus allowing the differential housing to be designed with a low profile and providing a significant saving in materials since the mass of the differential assembly may be reduced in proportion to the torque that is transmitted therethrough. The differential housing of the disclosed embodiment is made large enough to receive a family of differential assemblies having strength characteristics capable of handling a family of gear ratios between gears 74, 98 which range from the disclosed 1:1 ratio to a 1.5:1 ratio.

The differential gear train 70 is operable to transmit a rotary motion to a pair of center section drive shafts 100 when the planet carrier 66 is rotated by ring gear 74. Gear train 70 is disposed within a hollow 104 of carrier 66 and comprises a pair of beveled side gears or output gears 106 and a group of beveled planetary pinions 108 between and in mesh with side gears 106. Planet pinions 108 are rotatably carried on a group of pinion shafts 110 fitted into appropriate bores 112 in the differential carrier. Side gears 106 are journaled in the carrier in a conventional manner and are each provided with splines 114 which receive mating splines 116 on the inboard ends of center section drive shafts 100.

Figure 5:
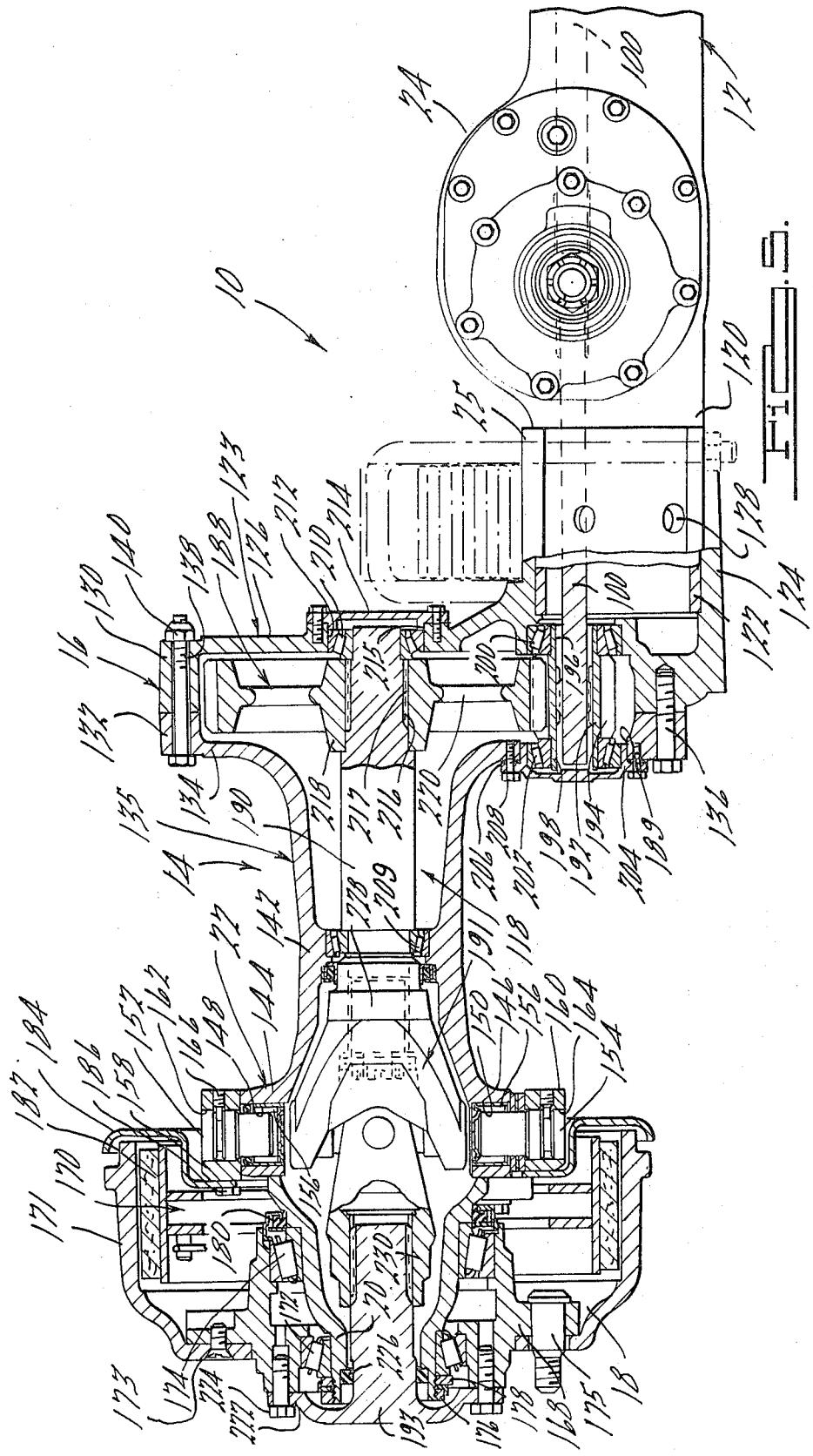
FIG. 5 is a fragmentary sectional view taken along the line 5—5 of FIG. 3.

Referring now to FIG. 5, this FIGURE shows details of the left side of axle 10 including a part of axle center section 12, gear reduction housing 16, end section 14, spindle housing 20, a portion of wheel assembly 18, and a drive train 118 interconnecting differential side gear 106 (FIG. 4) with wheel assembly 18. The right half of the axle outboard of differential housing 24 corresponds in structure to the left axle half and hence requires no further comment.

The left side of axle center section 12 includes a tubular housing portion 120 formed integral with differential housing 24 and machined on its outboard end 122, and an end piece 123. End piece 123 includes a collar portion 124, and a radially extending flange portion 126 which is eccentric to the axis of collar portion 124. Collar portion 124 is machined on its inner surface for a press fit with machined end 122 and has a plurality of circumferentially spaced holes 128 which provide areas for plug welding to increase the strength between the collar portion and end 122. Mounting pad 25 is provided by machining a flat surface on the top of collar 124.

Flange portion 126, which defines the inboard end of gear reduction housing 16, has an axially extending rim 130 formed on its outer periphery which is adapted to abut a mating rim 132 formed on the outer periphery of a radially extending flange portion 134 formed as the inboard end of an end section housing 135. Rims 130, 132 are secured together in a conventional manner by a plurality of bolts 136, 138 and nuts 140.

End section housing 135 further includes a tubular portion 142 and upper and lower arm portions 144, 146 which extend integrally outboard from portion 142 in fork fashion at end 22. Axially aligned and substantially vertically extending bores 148, 150 in arm portion 144, 146, respectively, receive upper and lower king pins 152, 154 which are journaled therein by needle bearing assemblies 156.

Spindle housing 20 is generally frustum of a cone and includes upper and lower arms 158, 160 at its inboard end which extend integrally outward in fork fashion. Axially aligned bores 162, 164 in arms 158, 160, respectively, receive extensions of king pins 152, 154 and pivotally secure the spindle housing to end section 14 for movement in a substantially horizontal plane. King pins 152, 154 are rigidly secured in bores 162, 164, respectively, in a conventional manner by set screws 166.

The portion of wheel assembly 18 shown includes a hub 168 and a brake assembly 170. Hub 168 is journaled on the spindle housing by tapered roller bearings 172, 174 and held against axial movement relative to the spindle housing by brake drum retaining nuts 176, 178 threaded on the outboard end of the spindle housing. An annular seal 180 shields the brake assembly from lubricant slinging from bearing 172, 174. Brake assembly 170 includes a brake drum 171, a pair of brake shoes 182 (one of which is shown), and a brake shoe support 184 which is secured to the spindle housing by plurality of bolts 186. Drum 171 is secured to hub 168 by a plurality of flat head screws 173 and studs 175.

Drive train 118 drivingly interconnects the rotational output of differentional side gear 106 (FIG. 4) to hub 168. Drive train 118 includes center section drive shaft 100, a speed reduction gear set 188, an end section drive shaft 190, a universal joint 191, and a spindle housing drive shaft 193.

Center section drive shaft 100, which is supported on its inboard end via its splined engagement with side gear 106 (FIG. 4), extends outboard through gear housing 16 and into a bore 189 in flange portion 134 of end section housing 135. The rotational axis of shaft 100 is parallel to and below an axis defined by end section drive shaft 190. The outboard end of shaft 100 is splined to loosely receive mating splines in a hub portion 192 of a helical pinion 194. Hub 192 includes annular flange sections 196, 198 which provide bearing seats for the inner races of tapered roller bearing 200, 202 respectively. Flange portion 126 of end piece 123 is adapted to provide a seat for the outer race of bearing 200. The outer race of bearing 202 is seated in a cup-shaped member 204 positioned in bore 189. Cup-shaped member 204 has a radially extending flange 206 which is secured to flange portion 134 by a plurality of bolts 208. The loose fitting spline connection between pinion 194 and shaft 100 allows the axis of pinion 194 to float askew of the axis of shaft 100 when the axle housing assembly flexes due to heavy loading.

Shaft 190 is journaled near its outboard end in a tapered roller bearing 209 which is seated in a necked down area of tubular portion 142 of end section housing 135, and at its inboard end by a tapered roller bearing 210 seated in a bore 212 in a flange portion 126. A disk-shaped cover 214 having an axially extending rib 215 is bolted to flange portion 126 to cover bore 212 and hold bearing 210 against axial movement. A portion of shaft 190 within gear housing 16 has splines 216 which engage mating spline 217 in a hub 218 of a helical gear 220 which is in mesh with pinion 194. Gear 194 and 220 together constitute speed reduction gear set 188 which is adaptable to provide a family gear ratios between 5.43:1 and 3.60:1.

Spindle shaft 193 has a radially extended flange 222 on its outboard end which is secured to hub 168 by a plurality of bolts 224. When secured to drum 168, flange 222 positions shaft 193 within housing 20 along an axis coaxial to wheel assembly 18 and skewed approximately downward of the axis defined by shaft 190. A seal 226 prevents lubricant leakage from bearing 172, 180 entering the interior of housing 20. Shaft 193 is drivingly connected to shaft 190 by universal joint 191. The inboard end 228 of universal joint 191 is splined and bolted to the outboard end of shaft 190 in a conventional manner. The outboard end 230 of universal joint 191 is slideably splined to the inboard end of shaft 193 in a manner facilitating removal of hub 168.

The disclosed front axle assembly is substantially interchangeable with comparable dead front axle assemblies so that the same truck chassis may accept either a standard dead axle, thereby producing a two-wheel drive vehicle, or the invention drive steer axle, thereby producing a four-wheel drive vehicle. This interchangeability is attributable to a combination of features, including the drop center section to provide clearance with respect to the vehicle powerplant, and the low profile differential housing which further enhances the powerplant clearance and also preserves satisfactory road clearance. The low profile differential housing is made possible by taking at most a small gear reduction at the differential and a relatively large gear reduction at the interface of the axle center section and the axle end sections. Taking little or no gear reduction at the differential also increases the speed of the rotating members between the differential input and the speed reduction gear sets, thereby reducing the torque requirements on these parts and allowing their mass to be reduced with consequent savings in materials. The invention drop center arrangement allows the proper powerplant and road clearances to be maintained while permitting a differential housing of sufficient size to accept a family of ring gears providing from 1:1 to 1.5:1 ratios in the differential assembly. The disclosed gear reduction housings at the interface of the axle center section and the axle end sections also provide a family of ratios ranging from 3.60:1 to 5.43:1. It will be apparent that the differential ratio and the gear reduction ratio may be selected and matched to produce a wide range of overall gear reduction ratios, readily encompassing all of the overall gear reduction ratios normally encountered in the various motor truck applications. The invention drive steer axle is thus readily and totally interchangeable with existing dead front axles, whether on an original equipment basis or a retrofit basis.

I claim:

1. A load bearing drive axle of the type adapted to journal steerable road wheel assemblies on its outboard ends, said axle comprising:
   A. a rigid axle housing including
      1. a pair of end section housings disposed about a substantially common axis,
      2. a dropped center section housing substantially parallel to said common axis and defining a differential housing disposed below said common axis, and
      3. a pair of gear housing sections rigidly connecting said dropped center section housing with said end section housings;
   B. a spindle housing pivotally secured to each of said end section housings and spaced from the respective gear housing section by the length of said end section housing, said spindle housings adapted to rotatably support said road wheel assemblies and be pivoted in unison to steer said raod wheel assemblies;
   C. a drive shaft positioned in each spindle housing and adapted to be secured at its outboard end to the respective road wheel assembly;
   D. a drive shaft journaled in each of said end section housings;
   E. drive means pivotally interconnecting the outboard end of each end section housing drive shaft and the inboard end of each spindle housing drive shaft;
   F. two drive shafts journaled in said center section housing;
   G. a gear set in each gear housing section and having first and second meshed gears drivingly connecting the outboard end of the respective center section housing drive shaft with the inboard end of the respective end section housing drive shaft; and
   H. a differential gear assembly mounted in said differential housing and having a pair of output gears secured to the inboard end of the respective center section housing drive shafts and an input gear means adapted to be drivingly coupled to an input shaft.

2. A load bearing drive axle of the type adapted to journal steerable road wheel assemblies on its outboard ends, said axle comprising:
   A. a rigid axle housing including
      1. a pair of end section housings disposed about a substantially common axis,
      2. a dropped center section housing substantially parallel to said common axis, and
      3. a pair of gear housing sections rigidly connecting said center section housing with said end section housing;
   B. a spindle housing pivotally secured to each of said end section housings and spaced from the respective gear housing by the length of said end section housing, said spindle housings adapted to rotatably support said road wheel assemblies and be pivoted in unison to steer said road wheel assemblies;
   C. a drive shaft positioned in each spindle housing and adapted to be secured at its outboard end to the respective wheel assembly;
   D. a drive shaft journaled in each of said end section housings;
   E. drive means pivotally interconnecting the outboard end of each end section housing drive shaft and the inboard end of each spindle housing drive shaft;
   F. two drive shafts journaled in said center section housing;
   G. a gear set in each gear housing section and having first and second meshed gears drivingly connecting the outboard end of the respective center section housing drive shaft with the inboard end of the respective end section housing drive shaft;
   H. a side gear differential assembly mounted in said center section housing and including
      1. a pair of output gears secured to the inboard end of the respective center section housing drive shafts, and
      2. a ring gear having a radius less than the combined radius of said first and second gears and adapted to be coupled to an input shaft.

3. An improved drive train for a four wheel drive vehicle of the type including a body, a frame supporting said body, a prime mover, rear road wheel assemblies, and steerable front road wheel assemblies; said drive train including a load bearing rear axle adapted to support the rear of said frame and also adapted to journal said rear wheel assemblies on its outboard ends, said rear axle having drive means for driving said rear wheel assemblies, the improvement comprising;
   A. a load bearing front steer axle including
      1. a rigid axle housing having a pair of end section housings disposed about a substantially common axis, a dropped center section housing substantially parallel to said end section housings and defining a differential housing disposed below said common axis, and a pair of gear housing sections rigidly connecting said center section housing with said end section housings,
      2. a spindle housing pivotally secured to each of said end section housings and spaced from the respective gear housing by the length of said end section housing, said spindle housings adapted to rotatably support said road wheel assemblies,
      3. a differential gear assembly positioned in said differential housing and having a pair of output gears, and an input gear means, disposed below said common axis,
      4. a gear set in each of said gear housing sections and having first and second meshed gears,
      5. two drive shafts journaled in said dropped center section housing and each drivingly connecting one of said output gears with a respective one of said first gears,
      6. a drive shaft journaled in each of said end section housings and drivingly connected at its inboard end to the respective second gear,
      7. a drive shaft journaled in each spindle housing and adapted to be drivingly connected to the respective wheel assembly, and
      8. drive means pivotally interconnecting the outboard end of each end section housing drive shaft and the inboard end of each spindle housing drive shaft;
   B. a drive transfer gear assembly including an input gear connected to said prime mover, a first output drive shaft connected to said rear axle drive means, and a second output drive shaft disposed below a horizontal plane defined by the rotational centers of said front and rear wheel assemblies; and
   C. a propeller shaft disposed below said horizontal plane and drivingly connecting said second output drive shaft with said differential input gear means.

* * * * *